(12) United States Patent
Buentello et al.

(10) Patent No.: US 11,748,676 B1
(45) Date of Patent: Sep. 5, 2023

(54) SYSTEMS AND METHODS FOR AUTOMATED DAMAGE ESTIMATION

(71) Applicant: United Services Automobile Association (USAA), San Antonio, TX (US)

(72) Inventors: Andre Rene Buentello, San Antonio, TX (US); Jose L. Romero, Jr., San Antonio, TX (US); Garrett Rielly Rapport, San Antonio, TX (US); Gregory Brian Meyer, San Antonio, TX (US); Michael Jay Szentes, San Antonio, TX (US); Mark Anthony Lopez, Helotes, TX (US); Ashley Raine Philbrick, San Antonio, TX (US)

(73) Assignee: United Services Automobile Association (USAA), San Antonio, TX (US)

(*) Notice: Subject to any disclaimer, the term of this patent is extended or adjusted under 35 U.S.C. 154(b) by 563 days.

(21) Appl. No.: 16/790,309

(22) Filed: Feb. 13, 2020

Related U.S. Application Data (60) Provisional application No. 62/805,778, filed on Feb. 14, 2019.

(51) Int. Cl.
| | |
|---|---|
| *G06Q 40/08* | (2012.01) |
| *G06Q 10/0631* | (2023.01) |
| *G06N 20/00* | (2019.01) |
| *G06N 5/04* | (2023.01) |
| *G06Q 10/0875* | (2023.01) |
| *G06V 20/50* | (2022.01) |
| *G06F 3/0484* | (2022.01) |
| *G06F 3/04815* | (2022.01) |

(52) U.S. Cl.
CPC ........ *G06Q 10/06315* (2013.01); *G06N 5/04* (2013.01); *G06N 20/00* (2019.01); *G06Q 10/0875* (2013.01); *G06Q 40/08* (2013.01); *G06V 20/50* (2022.01); *G06F 3/0484* (2013.01); *G06F 3/04815* (2013.01)

(58) Field of Classification Search
None
See application file for complete search history.

(56) References Cited

U.S. PATENT DOCUMENTS

| | | | |
|---|---|---|---|
| 10,007,992 B1 * | 6/2018 | Harvey | G06T 7/60 |
| 2010/0228585 A1 * | 9/2010 | Bradley | G06K 17/00 |
| | | | 705/317 |
| 2016/0284127 A1 * | 9/2016 | Rakshit | H04N 21/25866 |

FOREIGN PATENT DOCUMENTS

| | | | | |
|---|---|---|---|---|
| CA | 3157919 A1 * | 9/2021 | | G06F 16/29 |
| WO | WO-2018156506 A1 * | 8/2018 | | B64C 39/024 |

OTHER PUBLICATIONS

Hua, et al., "A Brief Review of Machine Learning and its Application", 2009, Information Engineering Institute Capital Normal University, entire document pertinent (Year: 2009).*

* cited by examiner

*Primary Examiner* — Paul S Schwarzenberg
(74) *Attorney, Agent, or Firm* — Fletcher Yoder, P.C.

(57) ABSTRACT

Systems and methods for virtual walkthroughs are provided. Pre-loss and post loss captures of an environment are captured and analyzed to identify loss estimates and trigger claim fulfillment based upon the loss estimates.

20 Claims, 7 Drawing Sheets

SYSTEMS AND METHODS FOR AUTOMATED DAMAGE ESTIMATION

CROSS-REFERENCES TO RELATED APPLICATIONS

The present disclosure is related to, and claims priority to, U.S. Provisional Patent Application Ser. No. 62/805,778, titled "SYSTEMS AND METHODS FOR AUTOMATED DAMAGE ESTIMATION," which was filed on Feb. 14, 2019, which is herein incorporated by reference in its entirety for all purposes.

BACKGROUND

This section is intended to introduce the reader to various aspects of art that may be related to various aspects of the present disclosure, which are described and/or claimed below. This discussion is believed to be helpful in providing the reader with background information to facilitate a better understanding of the various aspects of the present disclosure. Accordingly, it should be understood that these statements are to be read in this light, and not as admissions of prior art.

In an ever-evolving world, the number of costly goods is increasing. Oftentimes, in the event of a loss, a suitable inventory of lost goods is not available. Thus, it may be difficult to receive an accurate assessment of a total loss value. Further, attempts to determine the total loss are oftentimes cumbersome, involving an adjuster who manually accesses a loss environment. This can take quite some time, as there are a limited number of adjusters per area and losses tend cluster in areas. Thus, the limited number of adjusters may be responsible for a multitude of claims in the area at a given time. Further, without the benefit of property foreknowledge, loss assessment can be inaccurate.

Various refinements of the features noted above may exist in relation to various aspects of the present disclosure. Further features may also be incorporated in these various aspects as well. These refinements and additional features may exist individually or in any combination. For instance, various features discussed below in relation to one or more of the illustrated embodiments may be incorporated into any of the above-described aspects of the present disclosure alone or in any combination. The brief summary presented above is intended only to familiarize the reader with certain aspects and contexts of embodiments of the present disclosure without limitation to the claimed subject matter.

BRIEF DESCRIPTION OF THE DRAWINGS

The description herein refers to the accompanying drawings, wherein like reference numerals refer to like parts throughout the several views.

DETAILED DESCRIPTION

One or more specific embodiments will be described below. In an effort to provide a concise description of these embodiments, not all features of an actual implementation are described in the specification. It should be appreciated that in the development of any such actual implementation, as in any engineering or design project, numerous implementation-specific decisions must be made to achieve the developers' specific goals, such as compliance with system-related and enterprise-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

The techniques presented and claimed herein are referenced and applied to material objects and concrete examples of a practical nature that demonstrably improve the present technical field and, as such, are not abstract, intangible or purely theoretical. Further, if any claims appended to the end of this specification contain one or more elements designated as "means for [perform]ing [a function] . . . " or "step for [perform]ing [a function] . . . ", it is intended that such elements are to be interpreted under 35 U.S.C. 112(f). However, for any claims containing elements designated in any other manner, it is intended that such elements are not to be interpreted under 35 U.S.C. 112(f).

Figure 1:
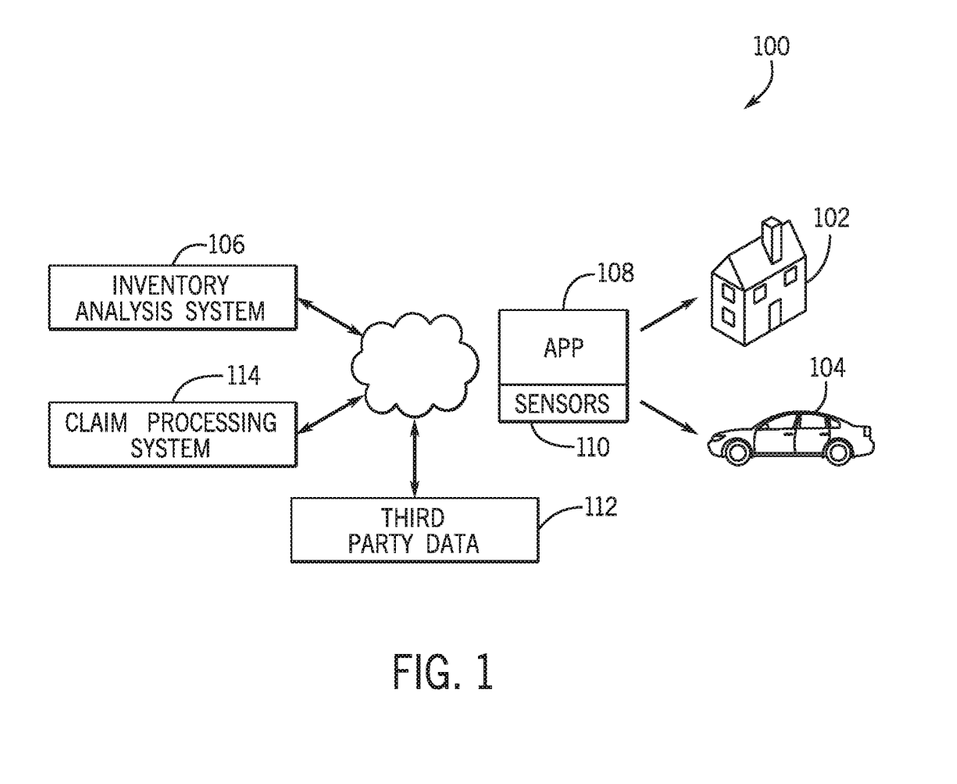
FIG. 1 is a block diagram of a generalized distributed computing system utilizing a cloud service type platform for tracking inventory and performing virtual walkthroughs, in accordance with an embodiment.

When dealing with insured loses, oftentimes the insured has not maintained an accurate inventory and/or state of insured property. This can lead to inaccurate loss estimates. Accordingly, the current systems and techniques automatically inventory and track insured property, resulting in increased accuracy in loss estimates. FIG. 1 is a block diagram of a generalized distributed computing system 100 utilizing a cloud service type platform for tracking inventory and performing automated damage inspection, in accordance with an embodiment. For example, the system 100 may be used to track items within an insured building 102, an insured vehicle 104, or other property.

To generate an inventory, an inventory analysis system 106 may receive captures of an environment where the insured property is situated. The captures may be captured via an application 108, which may control sensors 110 (e.g., thermal imagers, cameras, microphones, etc.) to capture visual and/or audible data of the insured property. The captures may be timestamped, such that it is clear when the captures were taken. This may be useful to ascertain the state of property at particular times, as will be discussed in more detail below.

The inventory analysis system 106 may receive the captures and use the captures to identify insured property and the state of the insured property (e.g., undamaged or damaged). To do this, the inventory analysis system 106 may use machine learning or other artificial analysis techniques to identify objects in the captures that have a particular threshold value amount. For example, the machine learning algorithms Third-party data providers 112 may provide data that is useful in generating the inventory. For example, an insured's credit card statement may indicate that a recent television purchase has occurred. The credit card statement may indicate a model number of the television and a purchase price for the television. Further, if the sensors 110 capture a new television installed at a proximate time to the entry in the credit cart statement, the inventory analysis system 106 may factor this in to an identification of a particular type of television to be listed in the inventory.

Once an inventory is generated, claims against the inventory may be processed by a claim processing system 114. For example, in some embodiments, the insured building 102, insured vehicle 104, or other property may be continually monitored for potential claim events. For example, claim events might include theft and/or damage to the insured building 102, insured vehicle 104, or other property. The claim processing system 114 may automatically appraise the claim valuation and initiate claim processing. This will be discussed in more detail with regard to FIG. 6.

Generating Inventories

Figure 2:
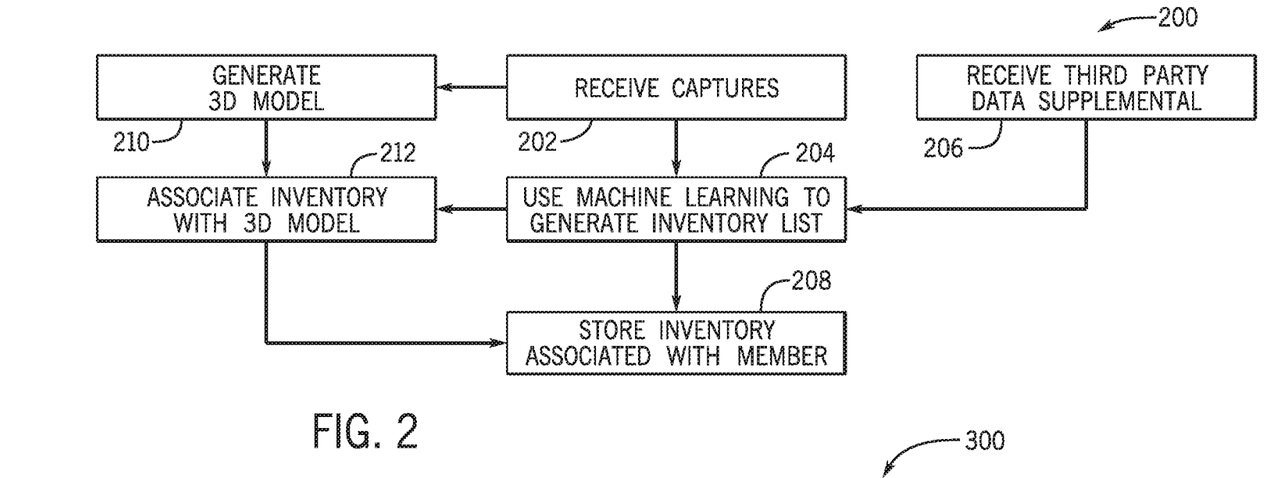
FIG. 2 is a flowchart, illustrating a process for generating a property inventory, in accordance with an embodiment.

The discussion now turns to a more detailed discussion of generating a property inventory. FIG. 2 is a flowchart, illustrating a process 200 for generating a property inventory, in accordance with an embodiment.

21.1. Captures

The process 200 begins with receiving captures of an environment where insured articles exist (block 202). The captures may include videos, images, audio and/or other data that may help in the identification of objects within the environment. The captures may be obtained via one or more sensors, such an infrared and/or visible light cameras, audio recording devices, etc. For example, in some embodiments camera data from an infrared camera may provide an indication of objects not visible by a visible light camera (e.g., behind a wall and/or in a safe). In some embodiments, the captures may include audio tones emitted by devices that provide an indication of location and/or type of device emitting the audio tone. For example, a television may provide an audio tone that indicates that it is a television and/or a particular brand and/or model of television. Further, based upon the vector of the tone, it may be possible to identify a general vicinity of the television.

Figure 3:
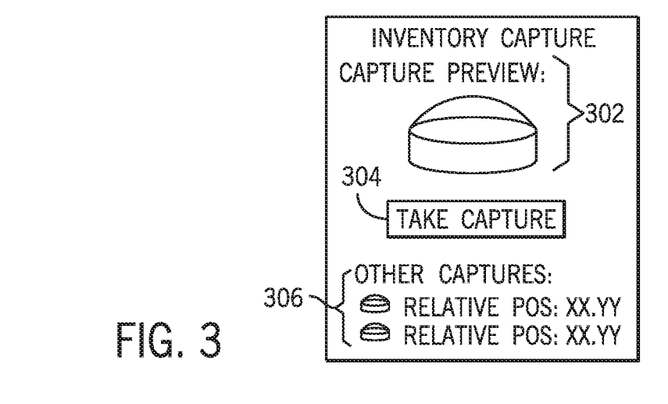
FIG. 3 is a schematic diagram, illustrating a graphical user interface (GUI) for capturing inventory, in accordance with an embodiment.

FIG. 3 is a schematic diagram, illustrating a graphical user interface (GUI) 300 for facilitating captures, in accordance with an embodiment. Upon an environment capture, a capture preview 302 may be presented. As illustrated, in the current embodiment, the capture is a 360 degree image. A selectable option 304 to take a capture may, when selected, cause a camera system to obtain a capture. Additionally and/or alternatively, the selectable option 304 may be used to schedule a capture and/or periodic captures by a camera system.

A list 306 of other relevant captures may also be provided via the GUI 300. For example, captures of other rooms of an environment may be provided along with a relative position of the capture. As discussed herein, the relative locations of the captures may facilitate the stitching process by identifying adjoining captures to be stitched together.

Figure 4A:
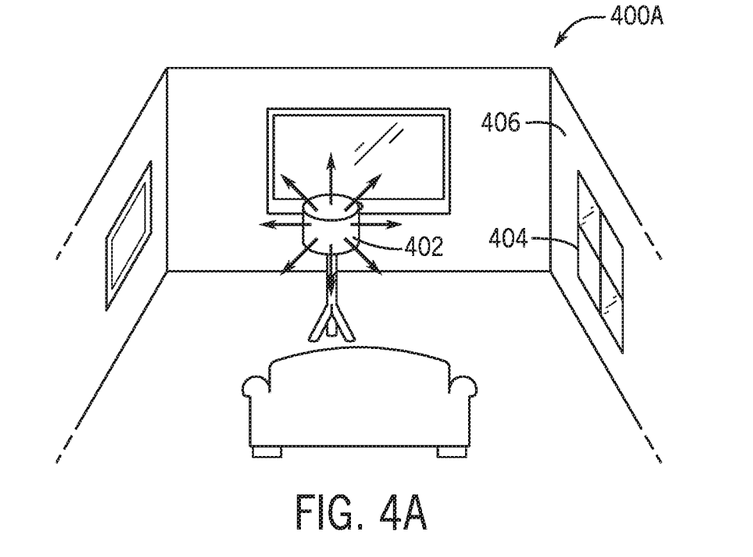
FIGS. 4A-4C are block diagrams, illustrating inventory captured in a pre-loss environment, using various capture mechanisms, in accordance with an embodiment.
Figure 4B:
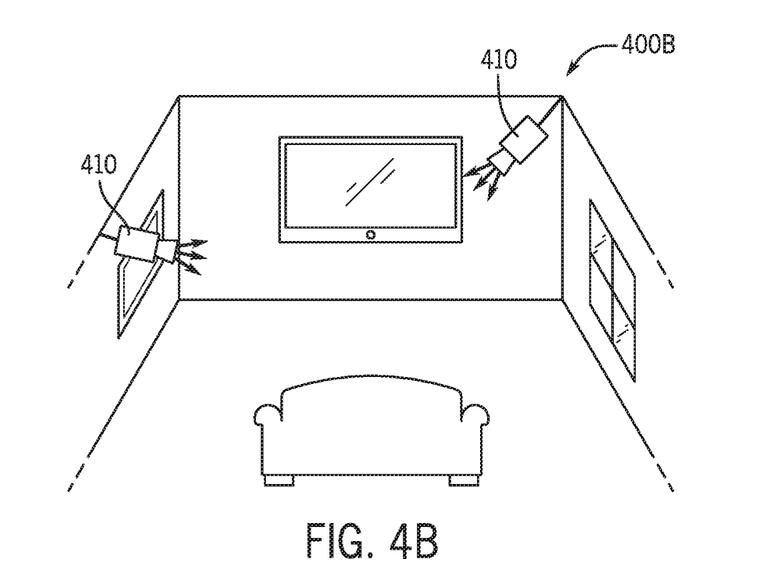
Figure 4C:
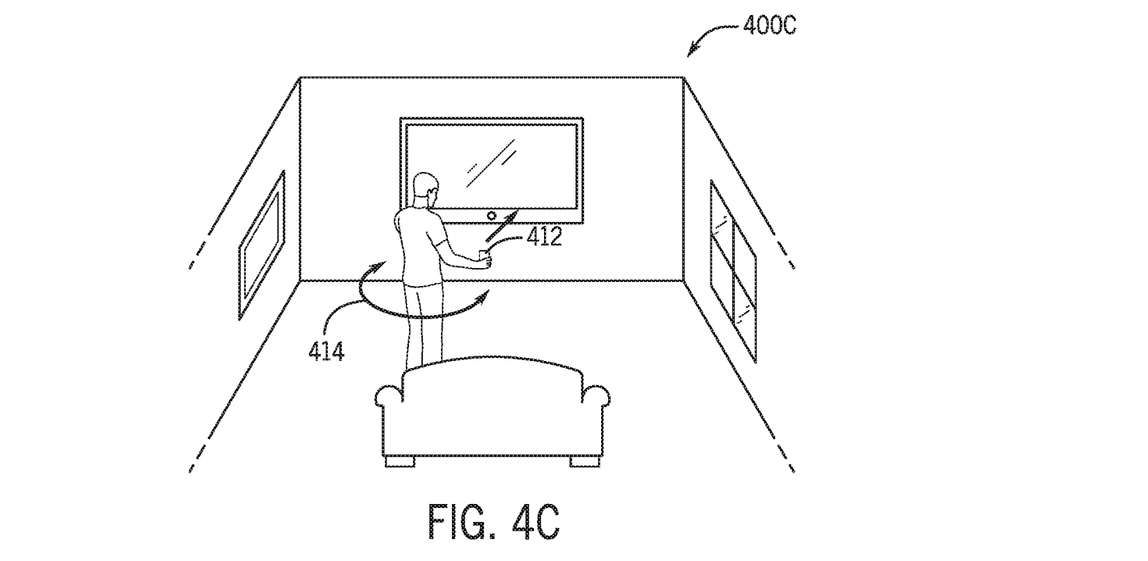

FIGS. 4A-4C are block diagrams, illustrating inventory capturing techniques 400A, 400B, and 400C in a pre-loss environment, using various capture mechanisms, in accordance with embodiments of the present disclosure. In FIG. 4A, a multi-degree camera system (e.g., a 360 degree camera system) 402 is used to capture a multi-degree view of the environment. As mentioned above, the capture of the environment may be stitched together with other captures, resulting in a 3D model of a multi-capture environment. For example, window 404 may be used as a reference point for a capture that takes place on the other side of wall 406, which may also include the window 404, albeit from the other side of the window 404. This reference may facilitate alignment of the stitching of captures.

In FIG. 4B, room cameras 410 are used to capture various angles of a room. While the room cameras may not provide a full 360 degree view of the room, they may be sufficient to capture enough angles of items in the room to be used in the inventory generation.

In FIG. 4C, a user facilitates a multi-degree capture by pointing an electronic device 412 and rotating 414. Using this technique, the electronic device 412 may capture a multi-degree panoramic image, which may be used as a capture for inventory generation purposes.

b. Inventory

Once the captures are received, machine learning may be used to generate an inventory list of items that are present in the captures (block 204). Machine learning is a branch of artificial intelligence that uses patterns to make decisions with minimal human intervention. Once supplied with training data that provides known results (e.g., actual device identifiers) for data (e.g., environment captures), the machine learning algorithms can identify patterns associated with the known results and predict subsequent results for subsequent captures based upon the patterns. For example, based upon training data, the machine learning algorithm may determine that a large black box floating on a living room wall is typically a television. Thus, the machine learning algorithm can predict that subsequent floating black boxes in a living room are likely televisions. Both positive and negative training data can be provided. For example, training data indicating that a floating black box is not a chair can be useful, just like positive training data can. In some instances, the training data may solely be input data provided to a machine learning algorithm. In other instances, feedback regarding results of the machine learning algorithm can be provided as further training data.

In some instances, third party and/or supplemental data may be received to help facilitate the machine learning (block 206). For example, a user may provide a manual indication of a model number, category, or other identifying information for an item. Further, user-specific information, such as a purchase history, demographic information, etc. may also be used as an input for the machine learning to help in the provision of more accurate predictions.

Once the items are identified (e.g., by machine learning) and an inventory list of the identified items is generated, the inventory is associated with a user and stored with the association to the user (block 208). For example, the inventory list may be provided to an external server that maintains inventory lists for a multitude of users. This may be beneficial, as when there is a claim loss, local computers that may store the list may be damaged or removed by an event causing the claim (e.g., theft, fire, flooding, etc.).

c. 3D Modelling

Further, once the captures are received, a three-dimensional (3D) model of the insured building 102, the insured vehicle 104, or other property may be optionally generated (block 210). The 3D model may indicate, in a 3D space, particular placements of items found in the captured environment. Further, the 3D model may stitch together captures from a variety of locations, the stitching being based upon relational locations to other captures. For example, a living room capture can be stitched to a bedroom capture based upon geo-location tags that indicate that the bedroom and the living room are next to one another. Further, the stitching may use features found in both captures for the stitching. For example, both the bedroom capture and the living room capture may include a door (e.g., that leads from the living room to the bedroom). Based upon identifying this feature, the stitching of the 3D model may include stitching the door from the living room capture to the door in the bedroom capture.

Figure 5:
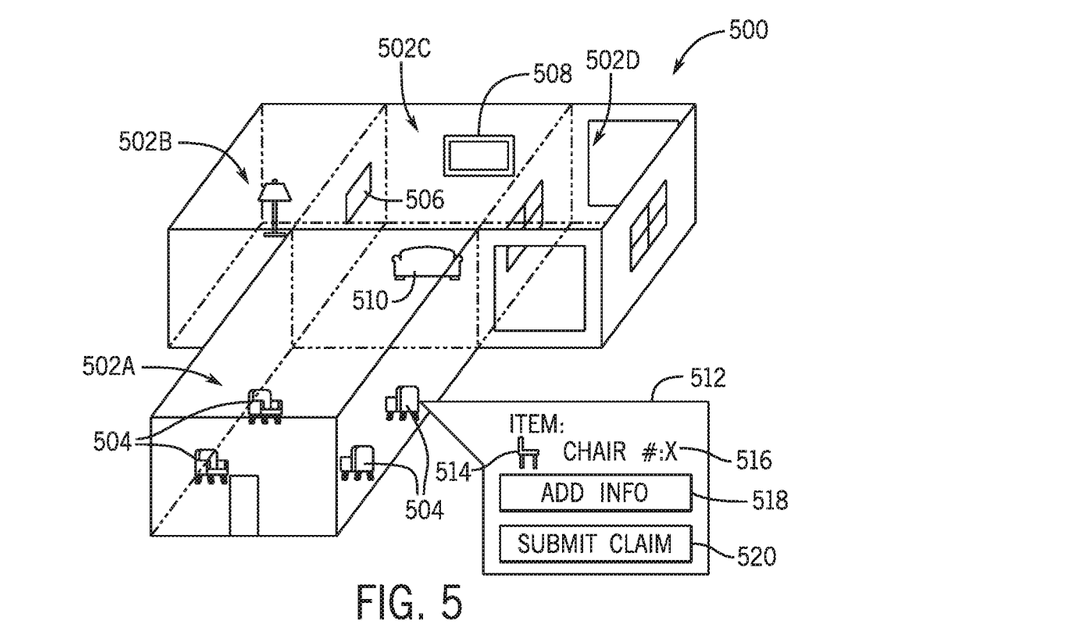
FIG. 5 is a schematic diagram of a three-dimensional model that includes a property inventory, in accordance with an embodiment.

Once the 3D model and the inventory is complete, the inventory may be associated with the 3D model (block 212). By associating the inventory to the 3D model, a representation of the inventory, as it is placed in the environment, may be provided. For example, FIG. 5 illustrates a schematic diagram of a three-dimensional model 500 that includes a property inventory, in accordance with an embodiment. The 3D model 500 includes a stitched together model of captures 502A, 502B, 502C, and 502D, which are each a capture from a particular room of the 3D modelled environment. As may be appreciated, capture 502C is the capture obtained from FIGS. 4A-4C. The 3D model includes the inventory identified by the captures. For example, chairs 504 are placed in in a portion of the 3D model 500 associated with capture 502A and picture 506, TV 508, and couch 510 are all placed in the portion of the 3D model 500 associated with capture 502C.

As discussed above, the inventory is associated with a user and stored (block 208). The 3D model may be part of that association, allowing for a more detailed understanding of placement of inventoried items, which may be useful for subsequent claim forensics, etc. The inventorying may be performed at different levels of granularity. For example, in some embodiments, only a first viewable layer of items are inventoried. However, in some embodiments, sensors can be used to inventory inside particular items. For example, cameras (e.g., wide-angle cameras) can be placed inside certain objects to perform further inventorying. For example, a camera may be placed inside of a refrigerator, which can inventory the contents of the refrigerator, a camera could be placed inside a closet, safe, tool box, shed, or other container, such that inventorying of the contents of the container may be performed.

The inventory may include identifying characteristics of the contained objects. For example, in the case of a refrigerator, a depletion amount (e.g., the milk is half consumed) and or a spoilage indication may be recorded. For example, to identify the depletion status, cameras may identify physical amounts of the inventoried items that remain after removal and replacement of the item within the refrigerator. For example, a bright light can be directed toward a milk carton, which may provide enhanced visibility of a liquid line present within the milk carton. Based upon this liquid line, a depletion amount relative to the carton may be identified. Regarding spoilage, in one embodiment, volatile organic compound (VOC) sensors may be provided to detect VOCs indicative of spoilage. The spoilage may be used to provide a verification that food has spoiled in a claimable event or to provide an indication to a user, such that the spoiled food can be removed from the refrigerator to avoid further VOC hazards. Such information could be beneficial in a short term rental situation where there may be less awareness of inventory of a refrigerator, as the refrigerator may be used by different persons at different times and there may be extended periods of non-use of the refrigerator.

The 3D model may be provided as an interactive 3D model to the user (e.g., via an electronic application). For example, the 3D model may be experienced via augmented/virtual reality technology, such as an immersive headset, augmented reality enabling eye glasses, a handheld device, etc. The user may select inventoried items to see information about the item, provide additional details about the item, and/or trigger a claim for the item. For example, upon selecting one of the chairs 504, a dialog box 512 may be presented. The dialog box 512 may include a picture of the item 514, a model number or other identifying information of the item 516, a selectable option 518 that, when selected, allows the user to input additional details about the chair, which may be associated with the inventory and/or use in subsequent machine learning for other inventory generating tasks, and a selectable claim submission icon 520 that, when selected, initiates a claim process for the item.

As may be appreciated, the 3D model provides an improvement over traditional inventorying. For example, placement of items within an environment may be a useful context for claim forensics. If, for example, a claim can be localized to a particular location represented by a portion of the 3D model, only inventory items within the portion of the 3D model may be processed, effectively filtering out other inventory items not found in the particular location. This may result in significant processing efficiencies for the computer, as far less of a scope of machine learning prediction may be required.

In some embodiments, as the user is interacting with the 3D model, smart devices (e.g., Internet of Things (IOT) devices) may be present in the model. These smart devices may have application programming interfaces (APIs) or other controllable software that enables software-based control of the smart devices. In some embodiments, the 3D model may associate the APIs with virtual control features within the 3D model, such that virtual control within the 3D model (e.g., via interactive gestures of the user while interacting with the 3D model) will result in execution of particular software control features that physically perform the control action on the smart device. For example, during the generation of the 3D model, the captured data and/or an inventory of the 3D model may indicate that a Model X smart thermostat is in the 3D model. APIs associated with the Model X smart thermostat may be identified (e.g., by querying a database) and particular physical control features (e.g., buttons, sliders, etc.) may be attributed with particular functions of the APIs. For example, an "Off" button of the Model X smart thermostat may be associated with a thermostat deactivation function of the Model X thermostat API. The 3D model may maintain these associations between the physical control features and the control software functions, such that when virtual gestures interacting with the virtual equivalent of the physical control features is observed, the associated control software functions are executed, resulting in actual control of the smart device via interactions with the 3D model. This may be very useful when performing a virtual walkthrough, as an inspector (e.g., a user interacting with the 3D model or software performing an automated analysis) may control features of the environment to mitigate further damage. For example, if the inspector is aware that airflow of an HVAC system is likely to create further fire risk, a gesture interaction to press the "Off" button on the Model X thermostat in the 3D model may result in execution of the deactivation control function for the physical thermostat, resulting in physical deactivation of the HVAC system via the Model X thermostat in the environment.

d. Captured Inventory Claim Facilitation

Figure 6:
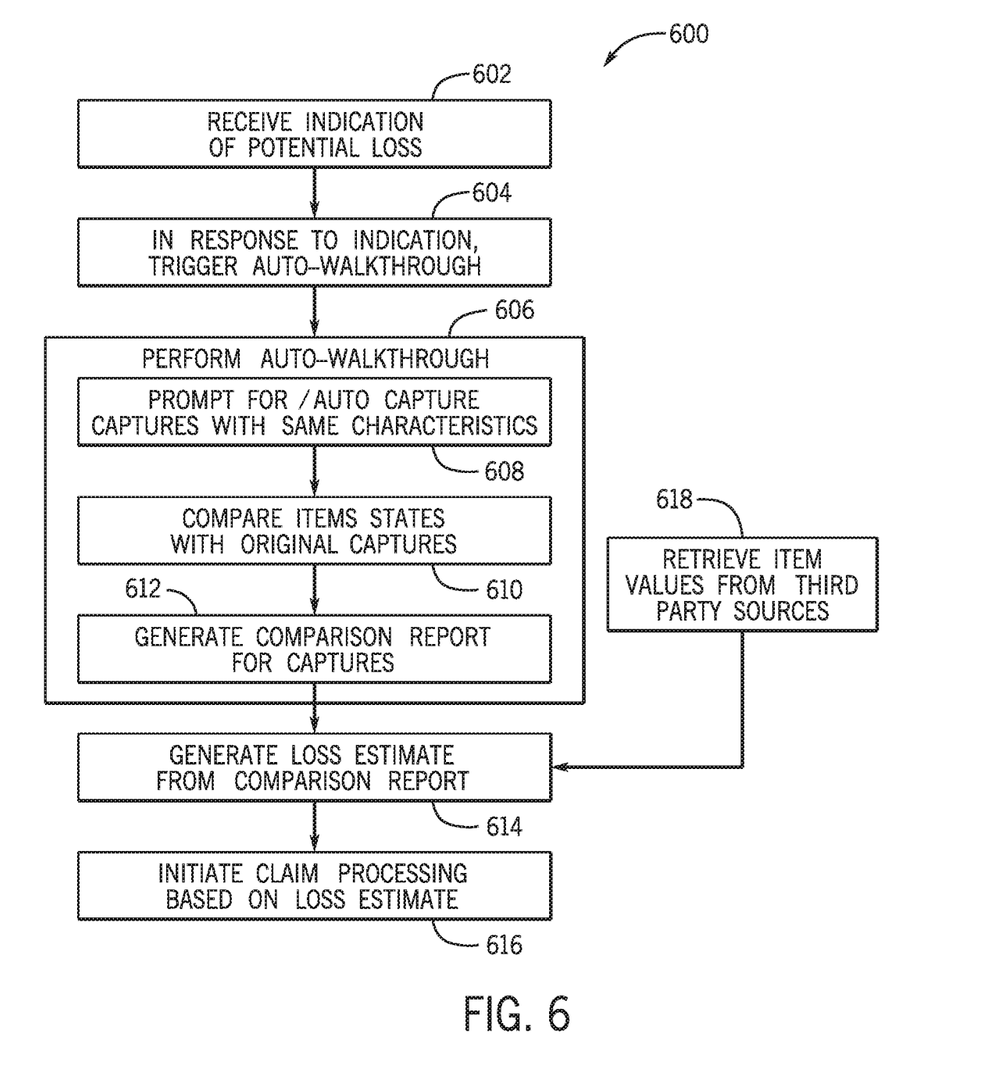
FIG. 6 is a flowchart, illustrating a process for automatically conducting a virtual walkthrough, in accordance with an embodiment.
Figure 7:
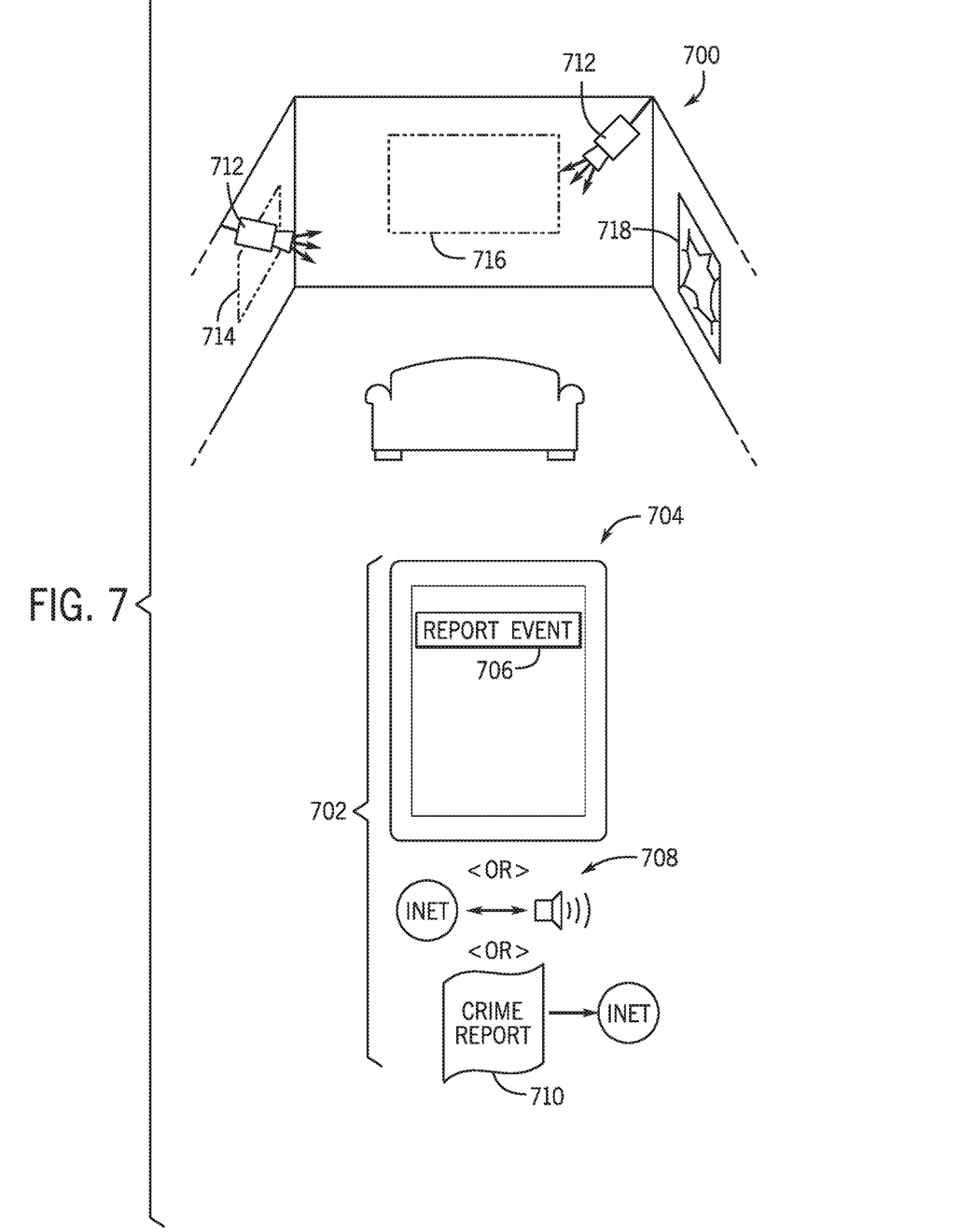
FIG. 7 is a schematic diagram of a post-loss environment, in accordance with an embodiment.

As previously discussed, claims may be facilitated through use of the generated inventory lists. FIG. 6 is a flowchart, illustrating a process 600 for automatically gathering post-claim event details, which can be used to facilitate a claim, in accordance with an embodiment. FIG. 7 is a schematic diagram of a post-loss environment 700, in accordance with an embodiment. To simplify the discussion, these figures will be discussed together.

In FIG. 6, the process 600 begins by receiving an indication of potential loss of insured property (block 602). For example, the indication may be sourced from an electronic device application, where a user indicates that a loss has taken place. Other examples include, but are not limited to, receiving vicinity information, such as an event report for an area that the insured property is in (e.g., "a tornado struck neighborhood X"), receiving a periodic capture of an environment, where the periodic capture shows a status change in the insured property, etc. Referring to FIG. 7, several possible indicator sources 702 are illustrated. As a first example, electronic device 704 may provide an indication as electronic data presented over an electronic communications channel, based upon a user input to report an event via selectable option 706 of a graphical user interface. Additionally and/or alternatively, an indication may be sourced from a triggered alarm 708, which may provide an indication of the triggered alarm 708 via data provided over an electronic communications network. Additionally and/or alternatively, an indication may be sourced from a crime report or other report 710, which may provide an indication of the claim event via data provided over an electronic communications network.

Returning to FIG. 6, in response to the indication of block 602, an automatic walkthrough may be triggered (block 604). For example, the indication may be a trigger that is provided to camera systems to perform a check to see whether items from the generated inventory have changed, are not present, etc.

Then, the automatic walkthrough is performed (block 606). To complete the automatic walkthrough, post-claim event captures are taken (block 608). To take these, a prompt (e.g., audible through a smart speaker and/or visual through a graphical user interface, as in FIG. 7) may be provided, requesting that a post-claim event scan be completed. The user may provide, via the prompt, permission to perform the scan (e.g., obtain the captures), may deny the request, or may present an alternative time to perform the scan. Alternatively, in some embodiments, the scan may be automatically implemented (e.g., without a prompt or if a user does not respond to the prompt, cancelling the scan, within an allotted time frame).

Returning to FIG. 7, the camera system 712 scans the environment to obtain post-claim event captures. As illustrated by the dashed lines 714, a picture was removed. Further, dashed lines 716 illustrate that a television was removed. Additionally, breakage 718 illustrates that the window was broken. Each of these item changes are captured by the post-claim event capture.

Once the captures are taken via the scan, item states of the generated inventory are compared with item states of the post-claim event captures (block 610). A comparison report detailing the changes between the inventory states of the items and the post-claim event state may be generated (block 612).

A loss estimate may be generated from the comparison/comparison report (block 614). In some instances, to understand item values, item values may be retrieved from third party sources, such as retailer websites, etc. (block 616). In some embodiments, the loss estimate may consider a percentage damage estimate based upon the status change in the item. Using the loss estimate, claim processing may be initiated (block 616).

Figure 8:
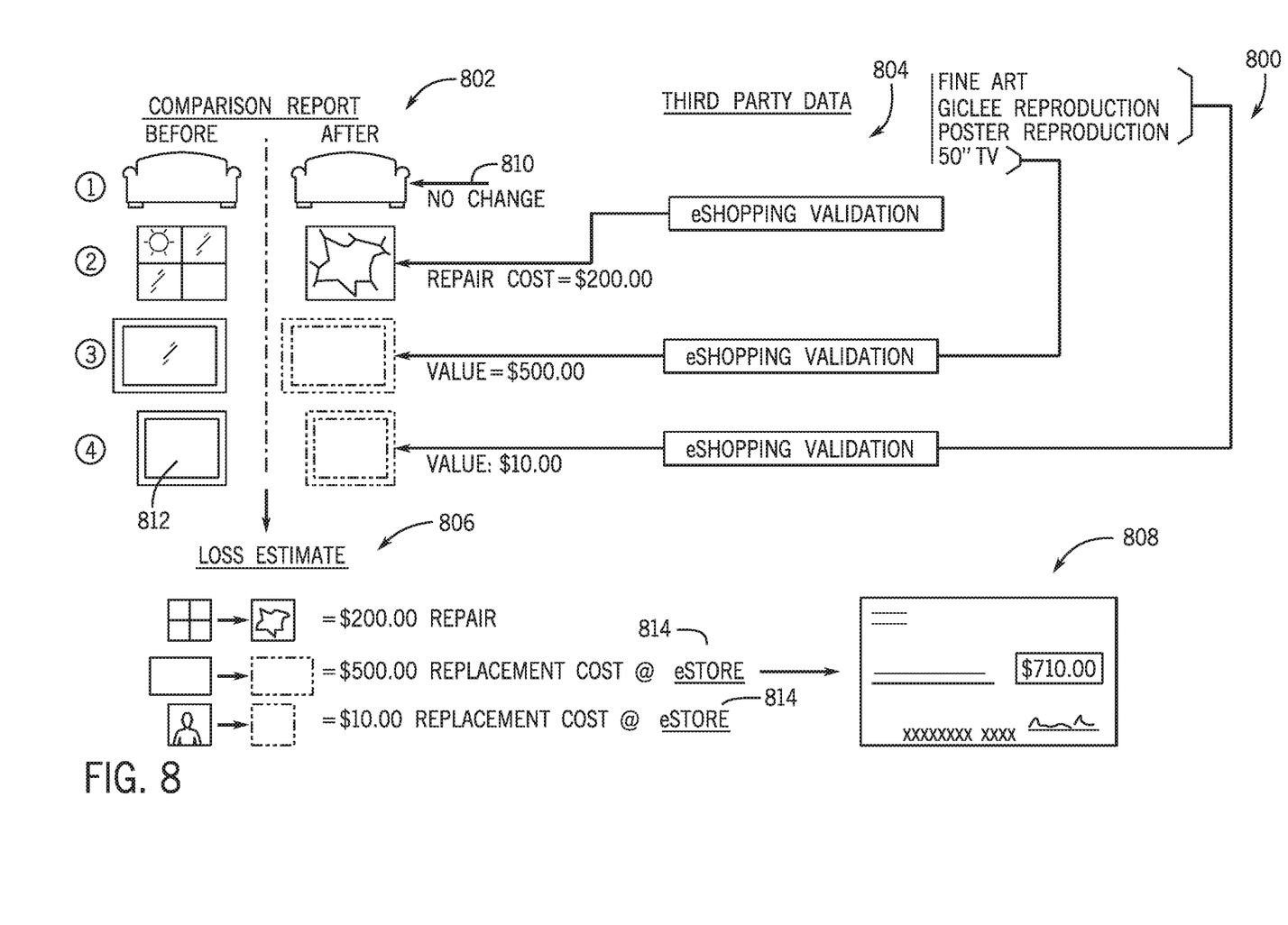
FIG. 8 is a block diagram, illustrating outputs of the process of FIG. 6, in accordance with an embodiment.

FIG. 8 is a block diagram, illustrating outputs 800 of the process of FIG. 6, in accordance with an embodiment. For example, a comparison report 802 is generated with assistance from third-party data 804. Further, a loss estimate 806 is generated based upon the comparison report, ultimately leading to facilitation of claim settlement 808.

As illustrated, the comparison report 802 provides a comparison of pre-claim event inventory item states with post-claim event inventory item states. As mentioned above, the 3D model may be used to facilitate efficient processing of inventory items. For example, if the claim is limited to a single room (e.g., the living room), the comparison report may be generated only for inventory items found in that room. This helps the computer to filter out irrelevant items, which may result in increased processing efficiencies, by reducing the scope of the machine learning processing.

As illustrated in the comparison report, the first item compared is the sofa. Based upon the pre and post-claim event captures, the processing system finds no changes in the sofa and thus, provides a no change status 810. The second item identified in the inventory is the window. Based upon the pre-claim event and post-claim event captures, a broken window is detected (e.g., by observing the cracking in the window in the post-claim event capture that was not in the pre-claim event capture). A query may be initiated via an electronic commerce application programming interface (API) to obtain quotes for repair of the window, given the window's characteristics, model, etc. A repair cost and/or replacement cost, here $200.00, may be returned from the API, resulting in a repair cost of $200 being attributed to the window.

The third item identified in the inventory is the television. The comparison indicates that the television existed pre-claim event but does not post-claim event. A replacement cost, here $500 may be obtained from the API based upon the television's characteristics (e.g., 50"), model, etc.

The third item identified in the inventory is the art. The comparison indicates that the art existed pre-claim event but does not post-claim event. A replacement cost may be obtained from the API based upon the art's characteristics (e.g., pattern, image, etc.). Here, the API has three versions of the art, a fine art version that is the original painting (e.g., worth $1,000,000), a giclee reproduction (e.g., worth $1,000), and a poster reproduction (e.g. worth $10.00). To obtain the proper replacement value, additional characteristics of the captures may be analyzed. For example, a reflectivity of the art may differentiate the different versions, where a poster is more reflective than a giclee reproduction, and a giclee reproduction is more reflective than an original. Additionally and/or alternatively, a numbering of the art, when present may indicate that the art is not the fine art, but instead, at best a giclee reproduction or a poster, where the art is most likely a giclee reproduction, as posters are mass produced and oftentimes not numbed. Here, the pre-claim event capture shows high reflectivity 812, indicating that the art is a poster. Accordingly, the value is set to $10.00.

Based upon the comparison report 802, the loss estimate report 806 is generated. The loss estimate report accumulates all value from the comparison report, providing a claim estimate for items impacted by the claim event. Here, the loss estimate report 806 includes $200 for repair of the window, $500 for replacement of the television and $10 for replacement of the poster. Additionally, when the API provides particular vendors that provide the items at the replacement cost, the vendors 814 may be provided in the loss estimate report 806.

Claim processing may be triggered based upon the generated loss estimate report 806. For example, here, a claim settlement 808 of $710.00 is provided the insured. As may be appreciated, the current techniques provide a significant technical advantage. Using the techniques provided herein, claim processing, including inventorying and claim loss estimates can be completed with little to no human subjectivity. Instead, by using the machine learning and capture comparison techniques described herein, efficient objective analysis can be completed by a computer system, resulting in more efficient and accurate claim processing.

What is claimed is:

1. A tangible, non-transitory, machine-readable medium, comprising machine-readable instructions, that when executed by one or more processors, cause the one or more processors to:
   receive, from a camera system, a pre-event capture of an environment;
   generate a three-dimensional (3D) model of the environment based upon the pre-event capture, wherein generating the 3D model comprises identifying control software associated with an Internet of Things (IoT) device and associating a function of the control software with the 3D model to enable operation of the function via virtual interaction with the 3D model;
   identify, using machine learning, items in the pre-event capture, wherein the operation of the function of the control software facilitates detection of at least a portion of pre-event information associated with one or more items of the items in the pre-event capture;
   generate an inventory list, by accumulating the items and associated pre-event information from the pre-event capture;
   apply the inventory list to the 3D model;
   present the 3D model with selectable item indicators for each of the items in the inventory list;
   upon selection of one of the selectable item indicators associated with an item, present a graphical dialog box with respective pre-event information associated with the item;
   receive, from the camera system, a post-event capture of the environment;
   identify, using machine learning, items in the post-event capture and receive post-event information associated with each item identified in the post-event capture;
   compare the items and the associated pre-event information in the inventory list with the items and the associated post-event information in the post-event capture to determine a portion of the items in the inventory list that are damaged or missing;
   generate a comparison report based upon comparing the items in the inventory list with the items in the post-event capture; and
   predict a loss estimate based upon the comparison report.

2. The machine-readable medium of claim 1, wherein the pre-event information associated with an item of the items in the inventory list comprises an amount of liquid of an object, the machine-readable medium comprising machine-readable instructions, that when executed by the one or more processors, cause the processors to:
   perform the compare, by:
   receive the post-event capture;
   operate the function of the IoT device to detect a liquid line within the object;
   based upon the liquid line, determine a depletion amount of the liquid; and
   store the depletion amount as an update to the amount of liquid of the object in the inventory list.

3. The machine-readable medium of claim 2, comprising machine-readable instructions, that when executed by the one or more processors, cause the processors to:
   prior to detecting the liquid line, activate a light associated with the IoT device and directed towards en the object to cause emphasis of the liquid line for easier detection of the liquid line.

4. The machine-readable medium of claim 1, comprising machine-readable instructions, that when executed by the one or more processors, cause the processors to:
   obtain, from a third party, a repair cost, a replacement cost, or both for a portion of the items in the post-event capture that are identified as damaged or missing.

5. The machine-readable medium of claim 4, comprising machine-readable instructions, that when executed by the one or more processors, cause the processors to:
   obtain the repair cost, the replacement cost, or both from an e-Commerce application programming interface (API).

6. The machine-readable medium of claim 5, wherein the inventory list comprises an indication of a particular version of multiple available versions of an item; the machine-readable medium comprising machine-readable instructions, that when executed by the one or more processors, cause the processors to:
   identify at least one of the items in the pre-event capture as one of multiple versions of an item based upon one or more characteristics of the at least one of the items that is present in the pre-event capture; and
   store, in the inventory list, the indication of the particular version based upon the identifying of the at least one of the items in the pre-event capture as the one of multiple versions of the item.

7. The machine-readable medium of claim 6, wherein the particular version comprises a poster and the one or more characteristics comprises a relatively high reflectivity as opposed to other versions of the multiple versions of the item.

8. The machine-readable medium of claim 1, wherein the camera system comprises a multi-degree camera.

9. The machine-readable medium of claim 1, wherein the camera system comprises a handheld electronic device comprising a camera that operates in a panoramic mode.

10. The machine-readable medium of claim 1, wherein the camera system comprises one or more cameras fixed in the environment.

11. The machine-readable medium of claim 10, wherein generating the 3D model comprises stitching together two or more pre-event captures received from the camera system.

12. The machine-readable medium of claim 1, comprising:
    upon detecting the virtual interaction, executing the function of the control software to implement a physical control of the IOT device.

13. A computer-implemented method, comprising:
    receiving, from a camera system, a pre-event capture of an environment;
    generating a three-dimensional (3D) model of the environment based upon the pre-event capture, wherein generating the 3D model comprises identifying control software associated with an Internet of Things (IoT)

device and associating a function of the control software with the 3D model to enable operation of the function via virtual interaction with the 3D model;

identifying, using machine learning, items in the pre-event capture, wherein the operation of the function of the control software facilitates detection of at least a portion of pre-event information associated with one or more items of the items in the pre-event capture;

generating an inventory list, by accumulating the items and associated pre-event information from the pre-event capture;

applying the inventory list to the 3D model, wherein each item of the inventory list and respective pre-event information associated with each item are configured to be presented in the 3D model;

receiving, from the camera system, a post-event capture of the environment;

identify, using machine learning, items in the post-event capture and receive post-event information associated with each item identified in the post-event capture;

generating a comparison report by comparing the items in the inventory list with the items in the post-event capture; and predicting a loss estimate based upon the comparison report.

14. The computer-implemented method of claim 13, comparing the items and the associated pre-event information in the inventory list with the items and the associated post-event information in the post-event capture to determine a portion of the items in the inventory list that are damaged or missing; and obtaining, from a third party, a repair cost, a replacement cost, or both for a portion of the items in the post-event capture that are identified as damaged or missing from an e-Commerce application programming interface (API).

15. A system, comprising:

a camera system, comprising a plurality of cameras positioned in an environment;

a processor, configured to:
  receive, from the camera system, a pre-event capture of an environment;
  generate a three-dimensional (3D) model of the environment based upon the pre-event capture, wherein generating the 3D model comprises identifying control software associated with an Internet of Things (IoT) device and associating a function of the control software with the 3D model to enable operation of the function via virtual interaction with the 3D model;
  identify, using machine learning, items in the pre-event capture, wherein the operation of the function of the control software facilitates detection of at least a portion of pre-event information associated with one or more of the items in the pre-event capture;
  generate an inventory list, by accumulating the items and associated pre-event information from the pre-event capture;
  applying the inventory list to the 3D model, wherein each item of the inventory list and respective pre-event information associated with each item are configured to be presented in the 3D model;
  receive, from the camera system, a post-event capture of the environment;
  identify, using machine learning, items in the post-event capture and receive post-event information associated with each item identified in the post-event capture;
  generate a comparison report by comparing the items in the inventory list with the items in the post-event capture; and
  predict a loss estimate based upon the comparison report.

16. The system of claim 15, wherein receiving the post-event information comprises controlling the operation of the function of the control software of the IoT device to detect at least a portion of the post-event information associated with one or more items of the items in the post-event capture.

17. The system of claim 16, wherein the function of the control software comprises a deactivation function, and wherein the virtual interaction with the 3D model is configured to cause the IoT device to deactivate to facilitate detection of the at least a portion of the post-event information associated with the one or more items in the post-event capture.

18. The machine-readable medium of claim 1, wherein receiving the post-event information comprises controlling the operation of the function of the control software of the IoT device to facilitate detection of at least a portion of the post-event information associated with one or more items of the items in the post-event capture.

19. The machine-readable medium of claim 18, wherein the function of the control software comprises a deactivation function, and wherein the virtual interaction with the 3D model is configured to cause the IoT device to deactivate to facilitate detection of the at least a portion of the post-event information associated with the one or more items in the post-event capture.

20. The computer-implemented method of claim 13, wherein receiving the post-event information comprises controlling the operation of the function of the control software of the IoT device to detect at least a portion of the post-event information associated with one or more items of the items in the post-event capture.

* * * * *

UNITED STATES PATENT AND TRADEMARK OFFICE
CERTIFICATE OF CORRECTION

| | |
|---|---|
| PATENT NO. | : 11,748,676 B1 |
| APPLICATION NO. | : 16/790309 |
| DATED | : September 5, 2023 |
| INVENTOR(S) | : Andre Rene Buentello et al. |

It is certified that error appears in the above-identified patent and that said Letters Patent is hereby corrected as shown below:

On the Title Page

In Item (57), under "Abstract", in Column 2, Line 1, delete "post loss" and insert -- post-loss --, therefor.

In the Specification

In Column 1, Line 34, delete "tend" and insert -- tend to --, therefor.

In Column 3, Lines 2-3, delete "algorithms" and insert -- algorithms. --, therefor.

In Column 3, Line 11, delete "cart" and insert -- card --, therefor.

In Column 3, Line 12, delete "in to" and insert -- into --, therefor.

In Column 3, Line 35, delete "such an" and insert -- such as an --, therefor.

In Column 5, Line 49, delete "and or" and insert -- and/or --, therefor.

In Column 6, Line 31, delete "(IOT)" and insert -- (IoT) --, therefor.

In Column 9, Line 7, delete "provided the" and insert -- provided to the --, therefor.

In the Claims

In Column 10, Line 12, in Claim 3, delete "en the" and insert -- the --, therefor.

In Column 10, Line 27, in Claim 6, delete "claim 5," and insert -- claim 1, --, therefor.

Signed and Sealed this
Twenty-first Day of November, 2023

*Katherine Kelly Vidal*

Katherine Kelly Vidal
*Director of the United States Patent and Trademark Office*

In Column 10, Line 53, in Claim 11, delete "claim 10," and insert -- claim 1, --, therefor.

In Column 10, Line 60, in Claim 12, delete "IOT" and insert -- IoT --, therefor.